May 17, 1949.   R. L. BRIGGS   2,470,334
ALTERNATING CURRENT LOAD INDICATOR
Filed June 13, 1946

INVENTOR
RUFUS L. BRIGGS
BY
ATTY.

Patented May 17, 1949

2,470,334

UNITED STATES PATENT OFFICE 2,470,334

ALTERNATING CURRENT LOAD INDICATOR

Rufus L. Briggs, Melrose, Mass., assignor to Raytheon Manufacturing Company, Newton, Mass., a corporation of Delaware Application June 13, 1946, Serial No. 676,398

5 Claims. (Cl. 177—311)

This invention relates to electrical circuits, and more particularly to a heat control adjustment indicator for alternating current welding equipment.

In alternating current resistance welding equipment, timing circuits, termed "synchronous A. C. timing panels," are utilized in connection with gaseous-discharge tubes for supplying welding current to the load for a predetermined number of cycles of the A. C. source. These timing panels ordinarily have an adjustment for varying the time delay between the input voltage and the output impulses thereof, which impulses are used to fire the said gaseous-discharge tubes to enable current to be supplied to the load. This time delay adjustment may be used whenever the natural power factor of the load changes to phase the output impulses of the timing panel with the current wave through the load, so that a full current wave, known as 100 per cent. heat, may be passed to the load. It is desirable that an indicator, for use while making this adjustment, be provided in the panel, so that the attainment of the optimum condition of 100 per cent. heat may be determined.

In some panels, this time delay adjustment is made to be variable over a greater range, in order to delay the firing of the main power tubes a greater time than that required by the natural power factor angle of the load. This provides a "heat control" by means of which a reduced heat value applied to the load may be obtained, since current may be applied to the load during only a portion of each half cycle of the voltage wave if so desired. The adjusting means in this case is used in conjunction with a dial which is calibrated in per cent. heat values from 100 down to the allowed minimum. As the natural power factor of the load changes, the time delay necessary to provide 100 per cent. heat likewise will change, so that the dial must be re-calibrated or some adjustment provided to make sure that a full current wave is passed to the load at "100 per cent. heat" on the dial. It is also desirable that an indicator be provided in the panel, for use while making this adjustment, so that the attainment of the condition of 100 per cent. heat may be determined.

An object of this invention is to provide a simple yet accurate indicator for heat control adjustment of alternating current welding equipment.

Another object is to provide a visual indicator for adjustment of the phasing circuits of A. C. welders.

A further object is to provide an inexpensive heat control indicator for synchronous A. C. timing panels.

A still further object is to provide a heat control adjustment indicator for A. C. welders which is instantaneous and which may be utilized by relatively unskilled personnel.

The foregoing and other objects of the invention will be best understood from the following description of an exemplification thereof, reference being had to the accompanying drawing, wherein.

Figure 1:
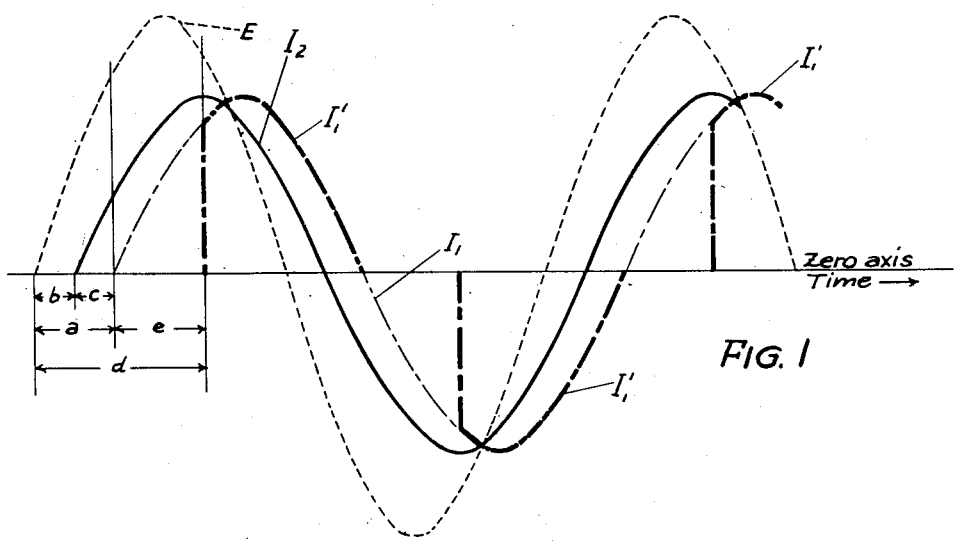
Fig. 1 is a set of curves useful for explaining the invention.

In Fig. 1, curve E represents the line voltage supplied from an A. C. source to a welding load, while curves $I_1$ and $I_2$ represent the load currents for two different loads having two different power factor angles $a$ and $b$, respectively. Curves $I_1$ and $I_2$ are full current waves, and represent the condition of 100 per cent. heat. The spaces $a$ and $b$ represent the respective time lags or delays, in the control circuit, between the input voltage E and the output impulses thereof which fire the main power tubes. It is apparent that, when the natural power factor of the load changes from $a$ to $b$, the time delay established by the control or timing circuit of the welder must be correspondingly changed or varied if 100 per cent. heat, or full current wave $I_2$, is to be supplied to the load. If said time delay were not varied, the portion of current wave $I_2$ represented by $a$—$b$ or $c$ would be lost as far as the load is concerned.

If a "heat control" is provided in the welding equipment, the time delay of the control or firing circuit of the main power tubes may be increased to some value $d$, for example, in order to provide a reduced "heat" to the load represented by $I_1$. This will give a load current represented by curve (impulses) $I'_1$, in which current is supplied to the load only during a portion of each current wave cycle $I_1$, leaving "gaps" represented by intervals $e$ in wave $I_1$. Although impulses $I'_1$ are represented as having vertical portions at intervals $d$, it will be understood that actually, due to the inductive character of the load, the rise of current from zero to the value represented by curve $I_1$ will not be instantaneous as shown, but will be more gradual. These portions of curve $I'_1$ are shown as vertical in order to simplify the drawing. For any fixed load power factor angle, the dial of the "heat control" is calibrated so that interval $a$ represents 100 per cent. heat. However, when the power factor angle of the load changes, as from $a$ to $b$, it will be seen that the dial of the "heat control" must be re-calibrated, since interval $a$ does not represent 100 per cent. heat for current wave $I_2$, but something less than 100 per cent., the difference being represented by interval $c$.

It is also important that the heat control adjustment be not "overcorrected," or advanced too far, because if this is done, other difficulties may be encountered. If the firing angle of the main power tubes is advanced beyond that point needed to exactly close the current gaps and achieve what is referred to as 100 per cent. heat (for example, if the firing angle is set at $b$ for current wave $I_1$), one of the main power tubes will fire at the end of interval $b$, sending current in the negative direction through the load during the time between the end of interval $b$ and the end of interval $a$. As a result, an odd number of half cycles of power are applied to the resistance welder during each weld, so that at the start of each weld there is a direct current component, and these components are always on the same side of the zero axis because the timing circuit always begins timing with the same polarity of voltage E. For example, if the timer is set for 1 cycle of power application, the welding transformer and the load may get part of an additional half cycle, making an odd number of half cycles. These direct current components, being always on the same side of the zero axis at the start of each weld, tend to saturate the welding transformer. This saturation may in turn lead to the drawing of destructive values of current by the welding load, which is of course undesirable. It therefore is also important that the heat control be not "overcorrected," as well as not "undercorrected," and this invention enables the true 100 per cent. heat condition to be readily ascertained.

Figure 2:
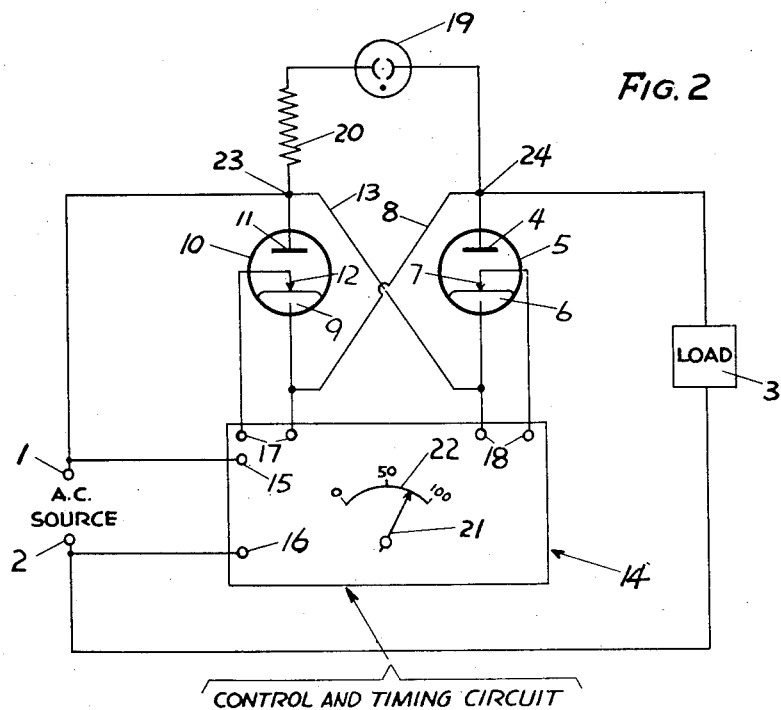
Fig. 2 is a diagrammatic representation of an embodiment of the invention.

This invention provides an indicator whereby the reaching of the condition known as 100 per cent. heat, (in which full current waves are supplied to the load) during the above-described adjustment made necessary by the change of load power factor angle, is instantaneously and visually indicated. In Fig. 2 the novel indicator circuit is diagrammatically shown. An alternating current source is connected to system input terminals 1 and 2. Terminal 2 is connected through the welding load 3 to the anode 4 of an ignitron 5 which includes a pool cathode 6 and a resistance-immersion igniter 7. Anode 4 is also connected, by means of a lead 8, to the cathode 9 of a second ignitron 10, which is similar to ignitron 5 and includes an anode 11 and an igniter 12. Anode 11 is connected to terminal 1 and also, by means of lead 13, to cathode 6 of ignitron 5. A control and timing circuit 14 has its input terminals 15 and 16 connected, respectively, to system input terminals 1 and 2, and its pairs of output terminals 17 and 18 connected, respectively, to the cathode-igniter circuits of tubes 10 and 5. A cold-cathode glow-discharge device 19, for example a neon glow lamp, is connected in series with a high resistance 20, between anodes 4 and 11.

Control and timing circuit 14 is adapted to provide, when it is energized by alternating current, a predetermined number of impulses at each of its pairs of output terminals 17 and 18, the impulses at pair 17 being displaced 180° in time phase with respect to those at pair 18, and each impulse having a certain adjustable time delay with respect to the alternating voltage supplied to input terminals 15 and 16. Such control and timing circuits are very old and well known as exemplified by the following United States Patents: Thomas 788,482, Toulon 1,654,949, Klemperer 1,995, Lord 2,082,644, Etzrodt 2,151,753, Levoy et al. 2,166,305 and many others. Therefore, the details of the timing circuit 14 are omitted herein. The said time delay may be varied by means of movable member 21 which cooperates with a dial 22. The impulses appearing at the pairs of terminals 17 and 18 are of such polarity that they may be utilized to "fire" main power tubes 10 and 5, alternately, during successive half-cycles of the alternating current, thereby allowing current to flow through the load and one or the other of these tubes in series, since the tubes 5 and 10 are connected oppositely to each other, in series between the source and the load.

The connections are so arranged that tube 10 is fired during the half-cycle in which anode 11, and input terminal 1, are positive, while tube 5 is fired during the half-cycle in which anode 4, and input terminal 2, are positive. When main power tube 10 is conducting, terminal 1 is positive and current flows through the load by means of a circuit traced as follows: terminal 1, point 23, anode 11, cathode 9, lead 8, point 24, load 3, and terminal 2. Tube 5 is not conducting at this time, so that no current flows therethrough. During the following half-cycle of the alternating current, terminal 2 is positive, tube 5 is conducting, and the load circuit is traceable as follows: terminal 2, load 3, point 24, anode 4, cathode 6, lead 13, point 23, and terminal 1. Tube 10 is not conducting at this time, so that no current can flow therethrough.

The voltage across the device 19 is that between points 23 and 24. When either one of power tubes 10 or 5 is conducting, the voltage between these two points is only the voltage drop across one of said tubes, which voltage drop is in phase with the current. This voltage drop is of the order of twelve to fifteen volts, which is insufficient to cause lamp 19 to glow, since the voltage required to light such a lamp is in excess of this voltage. Therefore while either of the power tubes 5 or 10 is conducting, the neon lamp 19 will not glow.

Under the condition known as 100 per cent. heat, as described above, full current waves, as shown at $I_1$ in Fig. 1, are supplied to the load 3, which means that one or the other of power tubes 5 or 10 is always conducting, so that the voltage between points 23 and 24 never rises above the tube voltage drop. Therefore, the existence of the condition of 100 per cent. heat is indicated by the complete absence of glow in lamp 19. The tube voltage drop is in phase with the current, as stated above, so that if full current waves are being passed to the load, the voltage between points 23 and 24 never rises above the tube voltage drop and lamp 19 does not glow.

At lower heat values, such as that indicated in Fig. 1 by curve $I'_1$, "gaps" such as intervals $e$ occur in the current supplied to the load. During these intervals $e$, neither of the main power tubes is conducting, so that there is no tube voltage drop. Due to the inductive character of the load, the current lags the voltage, and, since there is no tube voltage drop in phase with the current during the interval $e$, the voltage between points 23 and 24 rises during said interval to a substantial portion of full line voltage E, which portion of curve E is that included between the line denoting the beginning of said interval and the line denoting the end of said interval. This portion of line voltage E is sufficient to cause lamp 19 to glow, so that it glows during intervals such as e, when neither power tube is conducting, which intervals occur only at heat values below 100 per cent. heat. At the end of interval e, one of the power tubes begins to conduct, producing a voltage drop thereacross which is in phase with the current, dropping the voltage between points 23 and 24 to a small value which is the tube voltage drop and which is insufficient to maintain the glow in lamp 19, so that it now goes out. As time interval e is decreased by adjustment of member 21, the portion of the cycle during which lamp 19 glows is decreased, so that, visually, the glow appears to become dimmer and dimmer, finally being completely extinguished when interval e has been reduced to zero.

Resistor 20 is provided in series with lamp 19 to limit the current through said lamp during the intervals when neither of the power tubes is conducting, when a substantial portion of line voltage is applied to said lamp.

It is possible to quickly vary the time delay of control circuit 14, as from a to b or from d to a to b in Fig. 1, by movement of member 21 until the glow in lamp 19 just disappears, whenever the power factor angle of the load changes making it necessary to readjust for 100 per cent. heat, the condition of 100 per cent. heat being indicated by the absence of glow in lamp 19. The indicating circuit of this invention enables the 100 per cent. heat condition to be accurately attained, by means of a visual, inexpensive, and simple indicator.

Of course, it is to be understood that this invention is not limited to the particular details as described above, as many equivalents will suggest themselves to those skilled in the art. For example, it is possible to connect the lamp 19 across the anodes of the power tubes at the instant of "firing" for a given selected time interval, when it is not desired to use said lamp as an indicator of adjustment to 100 per cent. heat; that is, when the power factor angle of the load remains constant. If this is done, it will keep alternating current from being supplied to the load, in series with said lamp, during the intervals while the main power tubes are not conducting, on ordinary operation at heat values below 100 per cent. heat. Various other variations will suggest themselves. It is accordingly desired that the appended claims be given a broad interpretation commensurate with the scope of this invention within the art.

What is claimed is:

1. An indicator circuit for an alternating current load, including, in combination, a pair of parallel but oppositely-related controlled discharge tubes connected in series between a source of alternating current and a load adjustable control means connected to said discharge tubes and controlling them to conduct without substantial time delay between them, and a glow-discharge device connected across similar electrodes of said pair of discharge tubes.

2. An indicator circuit for an alternating current load, including, in combination, a pair of parallel but oppositely-related controlled discharge tubes connected in series between a source of alternating current and a load, said tubes each having at least an anode and a cathode, adjustable control means connected to said discharge tubes and controlling them to conduct without substantial time delay between them, and a glow-discharge device connected between the anodes of said tubes.

3. An indicator circuit for an alternating current load, including, in combination, a pair of controlled discharge tubes each having at least an anode and a cathode, means connecting the anode of one of said tubes and the cathode of the other of said tubes to a source of alternating current, means connecting the cathode of said one tube and the anode of said other tube through a load to the source, adjustable control means connected to said discharge tubes and controlling them to conduct without substantial time delay between them, and a glow-discharge device connected between said anodes.

4. An indicator circuit for an alternating current load, including, in combination, a pair of parallel but oppositely-related controlled discharge tubes connected in series between a source of alternating current and a load, said tubes each having at least an anode and a cathode adjustable control means connected to said discharge tubes and controlling them to conduct without substantial time delay between them, and a glow lamp in series with a resistor connected between the anodes of said tubes.

5. An indicator circuit for an alternating current load, including, in combination, a pair of controlled discharge tubes each having at least an anode and a cathode, means connecting the anode of one of said tubes and the cathode of the other of said tubes to a source of alternating current, means connecting the cathode of said one tube and the anode of said other tube through a load to the source, adjustable control means connected to said discharge tubes and controlling them to conduct without substantial time delay between them, and a glow lamp in series with a resistor connected between said anodes.

RUFUS L. BRIGGS.

REFERENCES CITED

The following references are of record in the file of this patent:

UNITED STATES PATENTS

| Number | Name | Date |
|---|---|---|
| 2,278,516 | Gulliksen | Apr. 7, 1942 |
| 2,360,068 | Martindell | Oct. 10, 1944 |
| 2,410,156 | Flory | Oct. 29, 1946 |